US012041311B2

(12) United States Patent
Fennelly

(10) Patent No.: US 12,041,311 B2
(45) Date of Patent: **\*Jul. 16, 2024**

(54) SYSTEMS AND METHODS FOR IDENTIFYING AND CORRELATING AN ADVERTISED OBJECT FROM A MEDIA ASSET WITH A DEMANDED OBJECT FROM A GROUP OF INTERCONNECTED COMPUTING DEVICES EMBEDDED IN A LIVING ENVIRONMENT OF A USER

(71) Applicant: Rovi Guides, Inc., San Jose, CA (US)

(72) Inventor: Timothy Jacob Fennelly, Reading, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,188

(22) Filed: Mar. 28, 2023

(65) Prior Publication Data

US 2023/0247258 A1    Aug. 3, 2023

Related U.S. Application Data

(60) Continuation of application No. 17/533,564, filed on Nov. 23, 2021, now Pat. No. 11,647,256, which is a
(Continued)

(51) Int. Cl.
  *H04N 21/478* (2011.01)
  *G06Q 20/12* (2012.01)
  (Continued)

(52) U.S. Cl.
  CPC ....... *H04N 21/47815* (2013.01); *G06Q 20/12* (2013.01); *G06Q 30/0251* (2013.01); *G06Q 30/0255* (2013.01); *H04N 21/23424* (2013.01); *H04N 21/254* (2013.01); *H04N 21/2542* (2013.01); *H04N 21/2543* (2013.01); *H04N 21/4316* (2013.01); *H04N 21/44226* (2020.08); *H04N 21/6581* (2013.01)

(58) Field of Classification Search
  None
  See application file for complete search history.

(56) References Cited

U.S. PATENT DOCUMENTS

| 7,761,892 B2 | 7/2010 | Ellis et al. |
| 8,046,801 B2 | 10/2011 | Ellis et al. |

(Continued)

*Primary Examiner* — Ricky Chin
(74) *Attorney, Agent, or Firm* — Haley Guiliano LLP

(57) ABSTRACT

Systems and methods for identifying and correlating an advertised object with a plurality of interconnected computing devices embedded in a living environment of the user. For example, a media guidance application implemented at a set-top box with a television may receive a signal from a printer indicating that cartridge ink is low. When the user is watching a television show and an advertisement relating to printer cartridges is being played, the media guidance application may identify that the advertised printer cartridges may be something that the user needs, and may then send a notification to a user of the advertisement. In this way, the media guidance application correlates advertisements from a media asset with a user's actual needs, which may improve the advertisement conversion rate for advertisers.

20 Claims, 8 Drawing Sheets

Related U.S. Application Data continuation of application No. 16/783,949, filed on Feb. 6, 2020, now Pat. No. 11,218,774, which is a continuation of application No. 16/227,497, filed on Dec. 20, 2018, now Pat. No. 10,595,092, which is a division of application No. 15/663,381, filed on Jul. 28, 2017, now Pat. No. 10,200,759.

(51) Int. Cl.
    *G06Q 30/0251*    (2023.01)
    *H04N 21/234*     (2011.01)
    *H04N 21/254*     (2011.01)
    *H04N 21/2543*    (2011.01)
    *H04N 21/431*     (2011.01)
    *H04N 21/442*     (2011.01)
    *H04N 21/658*     (2011.01)

(56) References Cited

U.S. PATENT DOCUMENTS

| | | | |
|---|---|---|---|
| 8,635,649 | B2 | 1/2014 | Ward et al. |
| 8,949,905 | B1 | 2/2015 | Truitner |
| 9,071,855 | B1 * | 6/2015 | Casey ............... H04N 21/4882 |
| 9,589,294 | B2 | 3/2017 | Cancro et al. |
| 10,115,127 | B2 | 10/2018 | Nomura et al. |
| 10,200,759 | B1 * | 2/2019 | Fennelly ............. G06Q 20/306 |
| 10,430,775 | B1 | 10/2019 | Bialostocki et al. |
| 10,595,092 | B2 * | 3/2020 | Fennelly ............. H04N 21/254 |
| 11,218,774 | B2 * | 1/2022 | Fennelly ............. G06Q 30/0251 |
| 2001/0049607 | A1 | 12/2001 | Tanaka et al. |
| 2001/0052133 | A1 | 12/2001 | Pack et al. |
| 2002/0162110 | A1 | 10/2002 | Wakimoto et al. |
| 2002/0174430 | A1 | 11/2002 | Ellis et al. |
| 2003/0229895 | A1 | 12/2003 | Jasinschi et al. |
| 2004/0064379 | A1 | 4/2004 | Anderson et al. |
| 2005/0251827 | A1 | 11/2005 | Ellis et al. |
| 2007/0169155 | A1 | 7/2007 | Pasquale et al. |
| 2008/0002892 | A1 | 1/2008 | Jelonek et al. |
| 2008/0196060 | A1 | 8/2008 | Varghese |
| 2010/0109901 | A1 | 5/2010 | Martin-Cocher et al. |
| 2010/0223131 | A1 | 9/2010 | Scott et al. |
| 2011/0225161 | A1 | 9/2011 | Zhong et al. |
| 2012/0123865 | A1 | 5/2012 | Salzano |
| 2012/0166303 | A1 | 6/2012 | Godwin et al. |
| 2013/0006805 | A1 | 1/2013 | Ulli |
| 2013/0124362 | A1 | 5/2013 | Katcher |
| 2013/0138477 | A1 | 5/2013 | Wilkins et al. |
| 2013/0144691 | A1 * | 6/2013 | Mehta ............... G06Q 30/0252 705/14.4 |
| 2013/0185157 | A1 | 7/2013 | Shihadah et al. |
| 2013/0205324 | A1 | 8/2013 | Sinha et al. |
| 2014/0019243 | A1 | 1/2014 | Cole et al. |
| 2014/0045484 | A1 | 2/2014 | Kim et al. |
| 2014/0108146 | A1 | 4/2014 | Rathus et al. |
| 2014/0157296 | A1 | 6/2014 | Amidei et al. |
| 2014/0188601 | A1 | 7/2014 | Buset et al. |
| 2014/0201783 | A1 | 7/2014 | Matz et al. |
| 2014/0214541 | A1 | 7/2014 | Pasila et al. |
| 2014/0245335 | A1 | 8/2014 | Holden et al. |
| 2014/0282638 | A1 | 9/2014 | Pequignot |
| 2014/0379469 | A1 | 12/2014 | Cipolletta et al. |
| 2015/0156544 | A1 | 6/2015 | Yarvis et al. |
| 2015/0170209 | A1 | 6/2015 | Smith et al. |
| 2015/0302510 | A1 * | 10/2015 | Godsey ............... G06Q 30/0635 705/26.81 |
| 2015/0350729 | A1 | 12/2015 | Reynolds |
| 2015/0365710 | A1 | 12/2015 | Bertrand et al. |
| 2015/0382069 | A1 | 12/2015 | Pearlman et al. |
| 2016/0027059 | A1 | 1/2016 | Lofthus |
| 2016/0180379 | A1 | 6/2016 | Salmon et al. |
| 2016/0275530 | A1 * | 9/2016 | Concannon ........ G06Q 30/0601 |
| 2017/0092107 | A1 * | 3/2017 | Flores ................. G08B 21/245 |
| 2017/0140438 | A1 | 5/2017 | Bhalgat et al. |
| 2017/0156539 | A1 | 6/2017 | Han et al. |
| 2017/0193548 | A1 | 7/2017 | Pacella et al. |
| 2017/0372165 | A1 | 12/2017 | Jouhikainen et al. |
| 2018/0084308 | A1 | 3/2018 | Lopatecki et al. |
| 2018/0096382 | A1 | 4/2018 | Maughan et al. |
| 2018/0114257 | A1 | 4/2018 | Conville et al. |
| 2018/0124438 | A1 | 5/2018 | Barnett |
| 2018/0152805 | A1 * | 5/2018 | Kohli ...................... H04W 4/02 |
| 2018/0199101 | A1 | 7/2018 | Kim |
| 2018/0218394 | A1 | 8/2018 | Kerns |
| 2018/0249205 | A1 | 8/2018 | Li et al. |
| 2018/0330427 | A1 | 11/2018 | Hussain |
| 2019/0364426 | A1 | 11/2019 | Muthukrishnan et al. |
| 2020/0252694 | A1 | 8/2020 | Fennelly |
| 2022/0141539 | A1 | 5/2022 | Fennelly |

\* cited by examiner

SYSTEMS AND METHODS FOR IDENTIFYING AND CORRELATING AN ADVERTISED OBJECT FROM A MEDIA ASSET WITH A DEMANDED OBJECT FROM A GROUP OF INTERCONNECTED COMPUTING DEVICES EMBEDDED IN A LIVING ENVIRONMENT OF A USER

CROSS-REFERENCE TO RELATED APPLICATIONS

This application is a continuation of U.S. patent application Ser. No. 17/533,564, filed Nov. 23, 2021, which is a continuation of U.S. patent application Ser. No. 16/783,949, filed Feb. 6, 2020, now U.S. Pat. No. 11,218,774, which is a continuation of U.S. patent application Ser. No. 16/227,497, filed Dec. 20, 2018, now U.S. Pat. No. 10,595,092, which is a divisional of U.S. patent application Ser. No. 15/663,381, filed Jul. 28, 2017, now U.S. Pat. No. 10,200,759, which are hereby incorporated by reference herein in their entireties.

BACKGROUND

In related art systems, an advertisement system may learn the interests of an individual user and generate customized advertisements for the user based on the user's interests. For example, related art systems may collect information relating to a user's browsing history, prior viewing history, subscriptions to media programs and/or social media history. The advertisement system may identify that the user has 'liked' a photograph of organic skincare products on social media. The advertisement system may then insert advertisements related to beauty products in a media program. The advertisement system may insert an advertisement during a commercial break when the user is watching the media program. However, by relying on a large amount of data relating to the user's Internet activities to identify user interests, the burden for the advertisement system to collect and process this large amount of data may be significant. In addition, for some advertisements that are embedded in a media program, e.g., product placement advertisements, it is unrealistic to customize such advertisements to target an individual user, as the advertised product is usually shown as part of a scene in the media program.

SUMMARY

Systems and methods are disclosed herein for identifying an advertised object from a media asset and providing the advertised object to a user by automatically identifying a level of user interest in the advertised object and correlating the advertised object with a plurality of interconnected computing devices embedded in a living environment of the user. For example, a media guidance application implemented at a set-top box, connected to a television, may receive a signal from a printer indicating that cartridge ink is low. When the user is watching a television show and an advertisement relating to printer cartridges is being played, the media guidance application may identify that the advertised printer cartridges may be something that the user needs, and may then send to the user a notification of the advertisement.

In this way, the media guidance application may customize advertisement delivery to a user by correlating advertisements from a media asset with a user's actual needs, without gathering and processing a large amount of data relating to the user's Internet activities and insert customized advertisements into the media asset for each individual user as related existing advertisement systems usually perform. The burden of data processing for an advertisement system or a media content server is, thus, largely reduced. In addition, related existing advertisement systems usually rely on mining user interests based on random user activities on the Internet, which may have limited accuracy in predicting any purchasing inclination of the user. Instead, the media guidance application identifies a demand directly from the Internet of things (IoT) devices from the living environment of the user, and matches an advertised object with the demand, which likely results in a purchase transaction of the advertised object. Thus, the media guidance application achieves a higher advertisement conversion rate for the advertised object.

To this end and others, in some aspects of the disclosure, the media guidance application may receive, from a remote source, a media asset and metadata corresponding to the media asset. The media guidance application may play, at user equipment, the media asset to the user. The media guidance application may then identify an advertised object from the metadata corresponding to the media asset at a time when the media asset is being played. For example, the media guidance application may retrieve the subtitle of the media asset and identify a commercial break, or the metadata may indicate when a product placement advertisement is embedded in a video frame of the media asset. The media guidance application may then poll a communication stack within a first wireless communications network operated under a first wireless network protocol, for status information of a plurality of computing devices interconnected via the first wireless communication network. For example, the media guidance application may poll for status information of network-enabled home device such as a printer, a coffee machine, a refrigerator and/or the like within a Bluetooth or Wi-Fi network. The media guidance application may then receive, via the first wireless communications network, an electronic status message from a computing device. The electronic message is indicative of a demanded object relating to the computing device, e.g., cartridge ink for a printer, coffee capsules for the coffee machine, etc.

In some embodiments, the media guidance application may limit the polling when there is no advertisement displayed to save power. For example, the media guidance application may determine a segment of the media asset that contains no advertised object based on the metadata corresponding to the media asset, and refrain from polling the communication stack when the segment of the media asset is being played. In another example, the media guidance application may only initiate polling when the user is paying attention to the advertisement being played. The media guidance application may monitor an engagement level of the user towards the media asset, and determine whether the engagement level at the time is greater than an engagement threshold. In response to determining that the engagement level at the time is less than the engagement threshold, the media guidance application may refrain from polling the communication stack for the status information of a plurality of computing devices at the time. In response to determining that the engagement level at the time is greater than the engagement threshold, the media guidance application may poll the communication stack at the time for the status information of a plurality of computing devices.

In some embodiments, in response to obtaining information relating to the demanded object, the media guidance application may compare the demanded object with the advertised object to determine whether the advertised object is related to the demanded object. For example, the media guidance application may determine a first set of attributes relating to the advertised object, such as a product type, a brand name, a keyword, and a corresponding computing device relating to the advertised object, and/or the like. Similarly, the media guidance application may determine a second set of attributes relating to the demanded object, such as a product type, a brand name, a keyword, and a corresponding computing device relating to the demanded object, and/or the like. The media guidance application may then compare the first set of attributes with the second set of attributes to determine an overlap percentage between the two sets of attributes, and determine whether the overlap percentage exceeds a matching threshold for the demanded object. In response to determining that the overlap percentage exceeds a matching threshold for the demanded object, the media guidance application may determine that the advertised object is related to the demanded object based on the comparing.

In response to determining that the advertised object is related to the demanded object based on the comparing, the media guidance application may send, to a user device (e.g., a mobile phone, a personal computer, a wearable device, etc.), an electronic communication including information relating to the advertised object. In some implementations, the media guidance application may send the electronic communication under a different wireless network than Bluetooth or Wi-Fi, e.g., the electronic communication is routed to a remote communication server (e.g., a cellular base station, etc.), such that the electronic communication is sent to the user device as a text or multimedia message via a cellular network (e.g., 3G, 4G, etc.).

In response to sending the electronic communication to the user device, the media guidance application may obtain a user indication that affirms a user demand for the advertised object. For example, the user may confirm an interest in the advertised object via a tap on the user interface, a voice command, a gesture, and/or the like. In response to obtaining the user indication that affirms a user demand of the advertised object, the media guidance application may send a transaction request to an electronic commerce website to complete a purchase of the advertised object. For example, the media guidance application may determine whether the metadata corresponding to the media asset includes information relating to the electronic commerce website corresponding to the advertised object, e.g., whether the metadata includes a field for a universal resource location (URL) link. In response to determining that the metadata corresponding to the media asset includes information relating to the electronic commerce website corresponding to the advertised object, the media guidance application may extract the information relating to the electronic commerce website and send the transaction request to the electronic commerce website. In response to determining that the metadata corresponding to the media asset does not include information relating to the electronic commerce website corresponding to the advertised object, the media guidance application may retrieve information relating to a previously stored electronic commerce website, e.g., Amazon.com®, BestBuy.com®, etc., and send a query including a search term relating to the advertised object to the previously stored electronic commerce website. In response to sending the previously stored electronic commerce website, the media guidance application may obtain a link to a product page relating to the advertised object, and send the transaction request to the product page relating to the advertised object.

In some embodiments, before sending a notification to the user device, the media guidance application may evaluate how relevant or crucial the advertised product is to the user. The media guidance application may store every demanded object and one or more attributes corresponding to the demanded object into a user interest table, and assign to the demanded object a priority score based on the one or more attributes. For example, an object that the user has a periodic subscription to, such as cartridge ink for a printer, coffee capsules for a coffee machine, etc., may be assigned a high priority score. Thus, the media guidance application may retrieve the priority score assigned to the demanded object, and determine whether the priority score is greater than a first pre-determined priority threshold. If the priority score is greater than the first pre-determined priority threshold, e.g., indicating a high priority of the demanded object, the media guidance application may automatically send the transaction request to the electronic commerce website to complete the purchase of the advertised object without user intervention. If the priority score is lower than the first pre-determined priority threshold but higher than a second pre-determined priority threshold, e.g., indicating a moderate priority of the demanded object, the media guidance application may send the electronic communication to the user device and subsequently send the transaction request to the electronic commerce website to complete the purchase of the advertised object in response to obtaining the user indication that affirms a user demand of the advertised object.

In some embodiments, the media guidance application may identify user interests in an object from user activities (e.g., Internet activities such as browsing history, social media 'likes,' etc.). The media guidance application may store the object and one or more attributes corresponding to the object into the user interest table, and assign a priority score to the object based on the obtained information relating to user activities indicating the user interest in the object and the type of the object. For example, if the user has previously purchased a product of the same type of the object, the media guidance application may assign a relatively higher priority score. If the user has merely 'liked' a photo relating to the object on social media, the media guidance application may assign a lower priority score. The media guidance application may generally assign a lower priority score to an object identified from user Internet activities compared to the score assigned to the demanded object identified directly through status information from a computing device.

In some embodiments, in response to determining that the advertised object is unrelated to the demanded object based on the comparing, the media guidance application may determine whether the advertised object corresponds to the object that the user has shown interest in from the user interest table. In response to determining that the advertised object corresponds to the object from the user interest table, the media guidance application may determine whether the priority score corresponding to the object is greater than the second pre-determined priority threshold. In response to determining the priority score is greater than the second pre-determined priority threshold, the media guidance application may send the electronic communication to the user device and subsequently send the transaction request to the electronic commerce website to complete the purchase of the advertised object in response to obtaining the user indication that affirms a user demand of the advertised object.

In some embodiments, the media guidance application may only initiate the polling and send notifications to the user during commercial breaks, so as to reduce any interruptive notification to the user when the user is engaged in watching a television program. For example, in response to polling the communication stack at the time for the status information of a plurality of computing devices, the media guidance application may determine whether the media asset is at a commercial break at the time based on the metadata corresponding to the media asset. In response to determining that the media asset is at the commercial break at the time, the media guidance application may send, to a user device (e.g., a user mobile device, etc.), an electronic communication including information relating to the advertised object when the advertised object is related to the demanded object. In response to determining that the media asset is not at the commercial break at the time, the media guidance application may refrain from sending, to the user device, the electronic communication and add the advertised object to a wish list associated with a user profile for user review at a later time.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
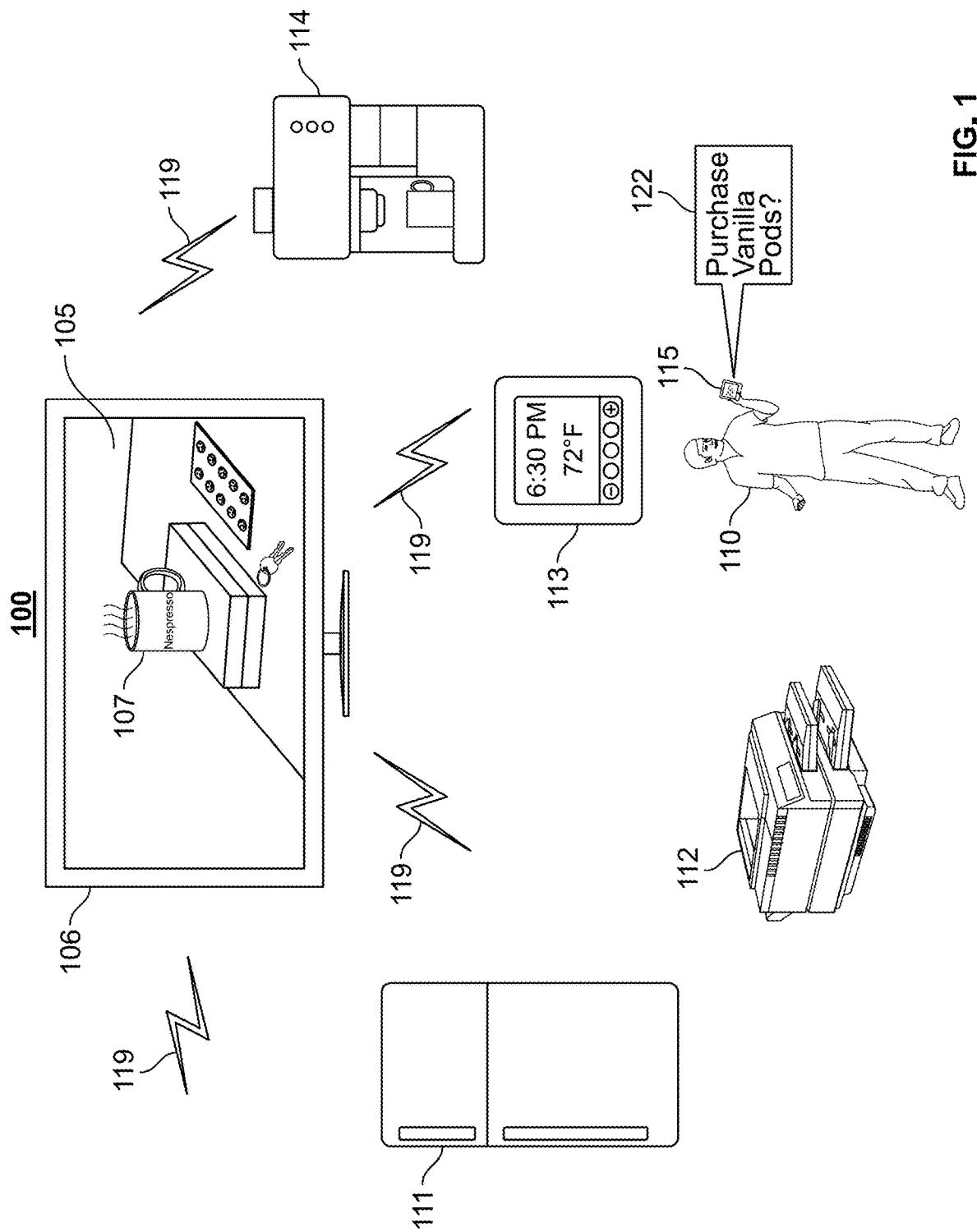
FIG. 1 depicts an illustrative diagram for identifying and correlating an advertised object from a media asset with a plurality of interconnected computing devices embedded in a living environment of the user, in accordance with some embodiments of the disclosure.

Systems and methods are disclosed herein for identifying an advertised object from a media asset and providing the advertised object to a user by automatically identifying a level of user interest in the advertised object and correlating the advertised object with a plurality of interconnected computing devices embedded in a living environment of the user. For example, a user may reside in an environment embedded with Internet of things (IoT), e.g., an interconnection of network-enabled computing devices embedded in everyday objects, such as a television, a printer, a coffee machine, a refrigerator, a laundry machine, an oven, a thermostat controller, and/or the like. The network-enabled computing devices may be interconnected within a local area network such as Bluetooth or Wi-Fi, and may share status information among the local area network. For instance, a media guidance application implemented at a set-top box with the television may receive a signal from a printer indicating that cartridge ink is low, and a new cartridge is needed by the printer. The media guidance application may, in turn, store information relating to the demanded printer cartridge, and identify an advertised printer cartridge from a television program as possibly relating to a user need. The media guidance application may then send a notification to the user, recommending to the user that the advertised printer cartridge may be suitable for a demand of the printer.

In this way, the media guidance application may correlate advertisements embedded in a media asset or played during a commercial break with the actual needs of a user. As the user may likely proceed to authorize a transaction of the advertised product when the advertised product fits an actual need, the advertisement conversion rate for advertisers may be improved. In addition, by identifying a user-demanded object with advertisements that have already been inserted in a media asset, the media guidance application no longer needs to devise and insert targeted advertisements based on user interests into the media asset for each individual user, and, thus, the burden of data gathering and processing for the media guidance application may be largely reduced.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As used herein, the term "ad" or "advertisement" is defined to mean an announcement or a notice featuring a product, a service or an event, displayed as part of the media asset. An "ad" or "advertisement" may include a variety of forms such as, but not limited to, a commercial program during a commercial break, a product placement advertisement, an overlay on top of the content of the media asset, and/or the like.

It is to be noted that embodiments described herein may be implemented by a media guidance application, or any other video, audio or other content management tool that is implemented on a computing device interconnected with other IoT devices.

With the advent of the Internet, mobile computing, and high-speed wireless networks, users are accessing media on user equipment devices on which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters" or providers" logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

FIG. 1 depicts an illustrative diagram for identifying and correlating an advertised object from a media asset with a plurality of interconnected computing devices embedded in a living environment of the user, in accordance with some embodiments of the disclosure. Diagram 100 shows a living environment of a user 110. The living environment is embedded with a plurality of computing devices including user equipment 106, a refrigerator 111, a printer 112, a thermostat 113, a coffee machine 114, and/or the like. The computing devices 106 and 111-114 are interconnected via a wireless connection 119, e.g., a Bluetooth or Wi-Fi network, to receive and transmit data.

Figure 5:
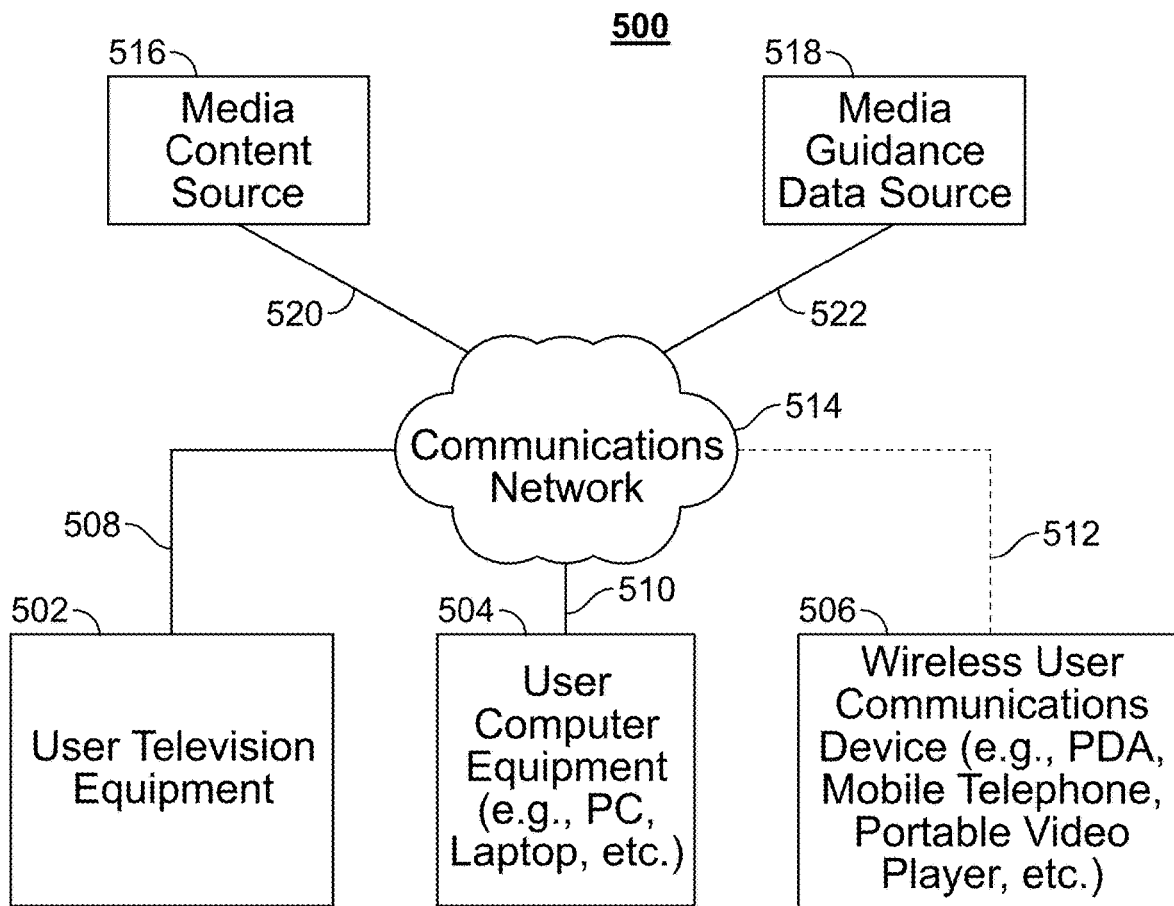
FIG. 5 is a block diagram of an illustrative media system in accordance with some embodiments of the disclosure.

A media guidance application may be implemented at a set-top box with the user equipment 106, which may receive, from a remote source (e.g., data sources 516, 518 via communications network 514 as discussed in relation to FIG. 5), a media asset 105 and metadata corresponding to the media asset, e.g., from content source 516 via communications network 514 as further described in relation to FIG. 5. The media guidance application may play, at user equipment 106, the media asset to the user 110.

The media guidance application may identify an advertised object, e.g., a coffee product 107, from the metadata corresponding to the media asset 105 at a time when the advertised object 107 is being displayed at user equipment 106. For example, the media guidance application may determine from the subtitle of the media asset and identify a commercial break, and identify keywords relating to the advertised product 107, e.g., "coffee," "Nespresso®," "French vanilla," "capsule," "quick refill," and/or the like. For another example, the metadata may include a structural file that includes a structured section tagged as "advertisement," which may indicate a product placement advertisement is embedded in a video frame of the media asset. For instance, a segment of the metadata, e.g., stored at storage 408 as further described in relation to FIG. 4, including a structural tag for an embedded advertisement for the advertised object 107 may take a form similar to:

```
<metadata>
<asset_id> XXXXX </asset_id>
<ad_tag_1>
   <start_time> 19:56 </start_time>
   <end_time> 19:59 </end_time>
   <ad_type> embedded </type>
   <commercial_break> no </commercial_break>
   <placement>
     <bottom_left>
        <x_coordinate> XXXX </x_coordiante>
        <y_coordinate> XXXX </y_coordinate>
     </bottom_left>
     <bottom_right>
        <x_coordinate> XXXX </x_coordiante>
        <y_coordinate> XXXX </y coordinate>
     </bottom_right>
     <top_left>
        <x_coordinate> XXXX </x_coordiante>
        <y_coordinate> XXXX </y coordinate>
     </top_left>
     <top_right>
        <x_coordinate> XXXX </x_coordiante>
        <y_coordinate> XXXX </y_coordinate>
     </top_right>
   </placement>
   <frame> "Nespresso_mug.jpg" </frame>
   <brand_name> Nespresso </brand_name>
   <product_type> beverage </product_type>
   <keyword> coffee, refill </keyword>
</ad_tag_1>
</metadata>
```

In the above example, the metadata for an embedded advertisement may include information relating to a position of the advertised object 107 shown at a screen of the user equipment 106, a time that the advertised object 107 may appear, a product type of the advertised object 107, and/or the like.

The media guidance application may then poll a communication stack within the wireless communications network 119 operated under the wireless network protocol, e.g., Bluetooth or Wi-Fi, for status information of a plurality of computing devices interconnected via the first wireless communication network. For example, the media guidance application may store an address on a communication stack representing each of the computing devices 111-114 under the wireless network 119, and may send a polling message, via an I/O path 402 as further described in relation to FIG. 4, to the addresses representing the computing devices 111-114 for a status update. For example, a pseudo-segment of a polling message to poll the communication stack may take a form similar to the following:

```
Host: 172.16.244.1
Destination: 172.16.244.5
<poll>
<host_id> MGA </host_id>
```

-continued

```
<destination_id> printer_HP_color </destination_id>
<query> status request </query>
</poll>
```

In some embodiments, the media guidance application may limit the polling when there is no advertisement displayed to save power. The media guidance application may determine a segment of the media asset that contains no advertised object based on the metadata corresponding to the media asset, and refrain from polling the communication stack when the segment of the media asset is being played. For example, when there is no advertisement embedded in the media asset, the media guidance application may temporarily enter into an "idle" mode and may only initiate polling again when the metadata of the media asset indicates an advertisement is being played. In some implementations, the media guidance application may only initiate polling during a commercial break. In some implementations, the media guidance application may monitor the metadata of the media asset, e.g., subtitle, advertisement tags, etc., for any product placement advertisements placed into the media asset, and initiate the polling accordingly.

In some embodiments, the media guidance application may only initiate polling when the user is paying attention to the advertisement being played. The media guidance application may monitor an engagement level of the user towards the media asset, and determine whether the engagement level at the time is greater than an engagement threshold. As used herein, the term "engagement" is defined to mean viewing and paying attention to an object, e.g., the media asset including the advertisement being played. For example, the media guidance application may employ the front-facing camera (e.g., part of the user input interface 410 as further described in relation to FIG. 4) to capture the physical location, line of sight, movement, gesture, etc. The media guidance application may further employ an audio recorder to record, via speakers 414 as further described in relation to FIG. 4, a vocal conversation from the user 110, ambient noise in the environment, or the like. The media guidance application may aggregate and analyze the monitoring data to determine a numeric value representing an engagement level of the user 110. Further discussion of determining whether a user is engaged in watching a media asset played on user equipment can be found in commonly owned and co-pending PCT International Application Nos. PCT/US2017/031755 and PCT/US2017/031765, both filed May 9, 2017, and PCT/US2017/031765, which are hereby incorporated by reference herein in their entireties.

In response to determining that the engagement level at the time is less than the engagement threshold, the media guidance application may refrain from polling the communication stack for the status information of a plurality of computing devices 111-114 at the time when the advertised object 107 is displayed at user equipment 106. In response to determining that the engagement level at the time is greater than the engagement threshold, the media guidance application may poll the communication stack at the time when the advertised object 107 is displayed at user equipment 106.

In response to the polling, the media guidance application may then receive, via the wireless communications network 119 (e.g., Wi-Fi or Bluetooth), an electronic status message from each computing device 111-114. The electronic message includes information indicative of a status of the computing device, which may indicate a deficiency of a demanded object relating to the computing device. For example, a status message from printer 112 may include information of a low cartridge ink level, indicating a demand for cartridge replacement. For another example, a status message from coffee machine 114 may include information of low coffee pod/capsules storage, indicating a demand for new coffee pods/capsules. For another example, a status message from the thermostat 113 may indicate undesirable air quality, which may relate to a demand for an air purifier. For example, a pseudo-segment of a status message to poll the communication stack may take a form similar to the following:

```
Host: 172.16.244.5
Destination: 172.16.244.1
<status>
  <host_id> printer_HP_color </host_id>
  <destination_id> MGA </destination_id>
    <power> normal </normal>
    <paper> 80% </paper>
    <color_ink>
      <red> 20% </red>
    </color_ink>
</status>
```

In some embodiments, in response to receiving a status message, the media guidance application may obtain information relating to the demanded object from the status message. For example, the media guidance application may retrieve previously stored rules (e.g., stored at storage 408 described in relation to FIG. 4, or data source 518 accessible via communications network 514 described in relation to FIG. 5) defining logics to identify the demanded object from a status message. For instance, the rule for printer 112 may indicate that an ink level lower than 30% indicates a demand for cartridge replacement. Thus in the above example status message, the media guidance application may read the status message and determine that the "red ink" level of 20% indicates a demand for cartridge replacement. For another, the rule for the thermostat 113 may specify that an air quality index lower than a threshold indicates a demand for objects relating to an air filter.

In some embodiments, the media guidance application may compare the demanded object with the advertised object to determine whether the advertised object is related to the demanded object. For example, the advertised object may be matched with the demanded object if they share the same product type, are both usable by the same computing device, and/or the like. The media guidance application may determine a first set of attributes relating to the advertised object, such as a product type, a brand name, a keyword, and a corresponding computing device relating to the advertised object, and/or the like. For example, for the advertised object 107, the media guidance application may identify attributes from the metadata such as, but not limited to, "coffee" (product type), "capsule" (product type), "pod" (product type), Nespresso® (brand name), "Vertuoline®" (brand name), "French vanilla" (keyword), etc. Similarly, the media guidance application may determine a second set of attributes relating to the demanded object, such as a product type, a brand name, a keyword, and a corresponding computing device relating to the demanded object, and/or the like, e.g., the demanded object for the coffee machine 114 including attribute such as, but not limited to, "coffee" (product type), "pack" (product type), "Nespresso®" (brand name), etc. The media guidance application may then compare the first set of attributes with the second set of attributes to determine an overlap percentage between the two sets of attributes, and determine whether the overlap percentage exceeds a matching threshold (e.g., 70%, 80%, etc.) for the demanded object. In response to determining that the overlap percentage exceeds the matching threshold for the demanded object, the media guidance application may determine that the advertised object is related to the demanded object based on the comparing. In the above example, if the advertised object 107, e.g., "Nespresso" coffee, overlaps with the demanded object, e.g., "Nespresso French vanilla pods," for 80% of the attributes, the advertised object 107 may be identified as related to the demanded object.

In some embodiments, the media guidance application may determine whether the advertised object is related to the demanded object based on pre-defined rules that are specific to the type of the demanded object or the computing device. For example, when the demanded object relates to the coffee machine 114, a set of pre-defined rules may request that the advertised object 107 match with the brand name of the demanded object. For another example, when the demanded object relates to the printer 112, a set of pre-defined rules may request that the advertised object match a specific type of product, e.g., home office products, etc.

In response to determining that the advertised object is related to the demanded object based on the comparing, the media guidance application may send, to a user device (e.g., a mobile phone, a personal computer, a wearable device, etc.), an electronic communication including information relating to the advertised object. For example, when the media guidance application identifies that an advertisement relating to "Nespresso® coffee" 107 with "French vanilla" flavor is being played at user equipment 106, and the Nespresso® coffee machine 114 demands more coffee capsules, the media guidance application may send a message "purchase more French Vanilla pods?" to the user device 115. In some implementations, the media guidance application may send the electronic communication under a different wireless network than Bluetooth or Wi-Fi, e.g., the electronic communication is routed to a remote communication server (e.g., a cellular base station, etc.), such that the electronic communication is sent to the user device as a text or multimedia message via a cellular network (e.g., 3G, 4G, etc.). In some implementations, the media guidance application may send the electronic communication through electronic mail, instant message, a voice message, and/or the like.

Figure 4:
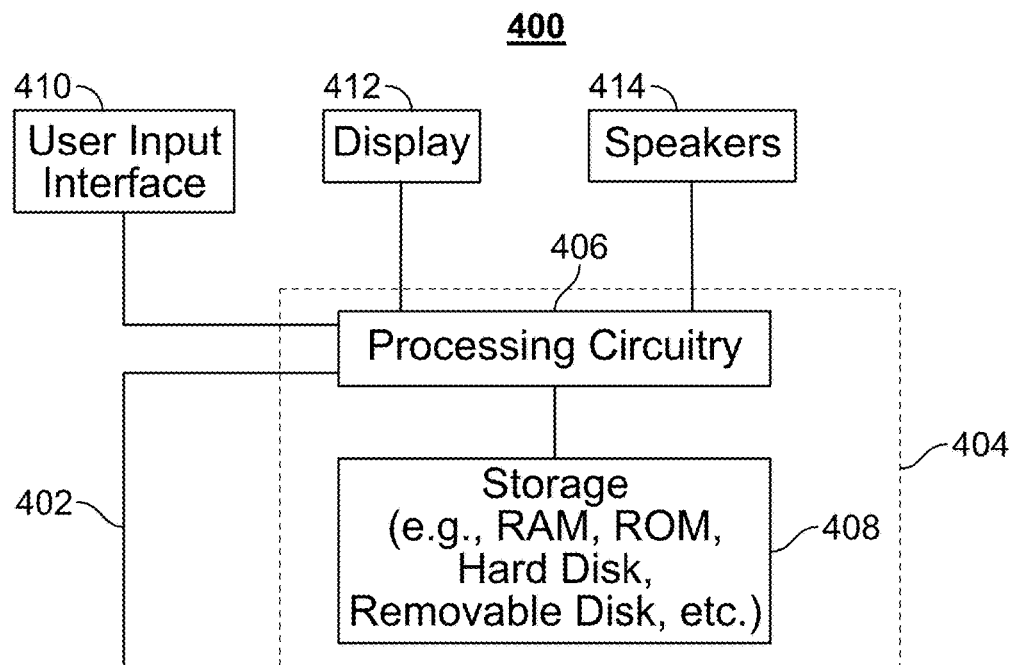
FIG. 4 is a block diagram of an illustrative user equipment (UE) device in accordance with some embodiments of the disclosure.

In response to sending the electronic communication to the user device, the media guidance application may obtain, via the user input interface 410 as further described in relation to FIG. 4, a user indication that affirms a user demand for the advertised object. For example, the user may confirm an interest in the advertised object by tapping or swiping on the user interface in response to the text message, or by communicating a voice command "yes," or by a gesture (e.g., shaking the user mobile device to indicate approval, etc.), and/or the like. In response to obtaining the user indication that affirms a user demand of the advertised object, the media guidance application may send a transaction request to an electronic commerce website to complete a purchase of the advertised object. For example, the media guidance application may determine whether the metadata corresponding to the media asset includes information relating to the electronic commerce website corresponding to the advertised object, e.g., whether the metadata corresponding to the media asset 105 includes a field for a universal resource location (URL) link relating to the advertised object 107. In response to determining that the metadata corresponding to the media asset includes information relating to the electronic commerce website corresponding to the advertised object, the media guidance application may extract the information relating to the electronic commerce website and sending the transaction request to the electronic commerce website. In response to determining that the metadata corresponding to the media asset does not include information relating to the electronic commerce website corresponding to the advertised object, the media guidance application may initiate a query on a previously stored electronic commerce website for the advertised object 107. For example, the media guidance application may retrieve information relating to a previously stored electronic commerce website, e.g., Amazon.com®, BestBuy.com®, etc., and send a query including a search term relating to the advertised object to the previously stored electronic commerce website. In response to sending the previously stored electronic commerce website, the media guidance application may obtain a link to a product page relating to the advertised object, and send the transaction request to the product page relating to the advertised object.

For example, the media guidance application may send a Hypertext Transfer Protocol (HTTP) PUT message to a server hosting the commerce website to initiate a transaction. The HTTP PUT message including the transaction request may take a form similar to the following:

```
PUT: transaction_request.php HTTP/1.1
Host: 172.16.244.1
Destination: www.nespresso.com/pods/french_vanilla/purchase
<transaction_request>
<host_id> MGA </host_id>
<user_id> john_smith </user_id>
<user_password> XXXXXX </user_password>
<URL> www.nespresso.com/pods/french_vanilla/purchase </URL>
<request_detail>
    <product_id> French_vanilla_008 </product_id>
    <quantity> 20 </quantity>
    <price> </price>
</request_detail>
</transaction_request>
```

In some embodiments, the media guidance application may only initiate the polling and send notifications to the user during commercial breaks, so as to reduce the amount of any interruptive notification to the user when the user is engaging in watching a television program. For example, in response to polling the communication stack at the time for the status information of a plurality of computing devices, the media guidance application may determine whether the media asset is at a commercial break at the time based on the metadata corresponding to the media asset. In response to determining that the media asset is at the commercial break at the time, the media guidance application may send, to a user device (e.g., a user mobile device, etc.), an electronic communication including information relating to the advertised object when the advertised object is related to the demanded object. In response to determining that the media asset is not at the commercial break at the time, the media guidance application may refrain from sending, to the user device, the electronic communication and adding the advertised object to a wish list associated with a user profile for user review at a later time.

In some embodiments, before sending a notification to the user device, the media guidance application may evaluate how relevant or crucial the advertised product is to the user. The media guidance application may store every demanded object and one or more attributes corresponding to the demanded object into a user interest table (e.g., stored at storage 408 described in relation to FIG. 4, or data source 518 accessible via communications network 514 as described in relation to FIG. 5), and assign to the demanded object a priority score based on the one or more attributes. For example, an object that the user has a periodic subscription to, such as cartridge ink for a printer, coffee capsules for a coffee machine, etc., may be assigned to a high priority score. For another example, an object that is related to system maintenance of a device, e.g., upgrade cache memory for a control unit, may also be assigned to a moderate priority score. For another example, objects that are less urgent, that exceed a purchase amount, or the user has not purchased before, etc., such as an expensive air purifier, may be assigned to a relatively lower priority score.

In some embodiments, the media guidance application may further store objects that the user may be interested in the use interest table, by identifying user interests in an object from user activities (e.g., Internet activities such as browsing history, social media 'likes,' etc.). For an object that is not identified as demanded by a computing device 111-114, e.g., the object may be identified from the user's browsing history, etc., the priority score for the object may be relatively lower. The media guidance application may store the object and one or more attributes corresponding to the object into the user interest table, and assign a priority score to the object based on the obtained information relating to user activities indicating the user interest in the object and the type of the object. For example, if the user has previously purchased a product of the same type of the object, the media guidance application may assign a higher priority score. If the user has merely 'liked' a photo relating to the object on social media, the media guidance application may assign a lower priority score. The media guidance application may generally assign a lower priority score to an object identified from user Internet activities to the demanded object identified directly through status information from a computing device. An example priority table for different objects may take a form similar to the following:

TABLE 1

Example Priority Score Table

| Object | Computing Device | Identified by | Priority Score |
|---|---|---|---|
| Coffee pod | 1. Coffee Machine | 2. Status polling | 3. 0.8 |
| 4. Printer Cartridge | 5. Printer | 6. Status polling | 7. 0.8 |
| 8. Water Filter | 9. Refrigerator | 10. Status polling | 11. 0.7 |
| 12. Air Filter | 13. Thermostat | 14. Status polling | 15. 0.6 |
| 16. | 17. | 18. | 19. |
| 20. Volcano Mud Facial | 21. N/A | 22. Facebook 'like' | 23. 0.3 |
| 24. Water Facial Therapy | 25. N/A | 26. Yelp comment | 27. 0.2 |
| 28. | 29. | 30. | 31. |

Thus, the media guidance application may retrieve the priority score assigned to the demanded object from the priority score table, and determine whether the priority score is greater than a first pre-determined priority threshold. For example, the priority score corresponding to "coffee pods," e.g., 0.8, may be greater than the first pre-determined priority threshold of 0.75, indicating a high priority of "coffee pods" as the user usually has periodic repurchases. In this case, the media guidance application may automatically send the transaction request to the electronic commerce website to complete the purchase of "coffee pods," without the user manually initiating a purchase request. For example, the user may respond to the advertisement being displayed on user equipment 106 by a voice command "ok," and the media guidance application may capture the voice command and facilitate the transaction. In this way, the media guidance application may streamline the purchase of a demanded object of high priority with improved efficiency. For another example, the priority score may be lower than the first pre-determined priority threshold but higher than a second pre-determined priority threshold, e.g., the priority score for an "air filter" is 0.7 which is lower than the first threshold of 0.75 but higher than a second threshold of 0.6. The priority score of the "air filter" may indicate a moderate priority for "air filter," e.g., the user may not have a periodic repurchase history of the object and any transaction request needs user authorization. Thus, the media guidance application may send an electronic communication 122 to the user device 115 for user confirmation and authorization to initiate a purchase. In some implementations, when the user does not authorize any transaction request to purchase the advertised object in response to the electronic communication 122, the media guidance application may add the advertised object to a wish list associated with the user profile for the user to review later. For another example, if the advertised object corresponds to a priority score lower than the second priority threshold, e.g., "water facial therapy" of a priority score of 0.3 which is lower than the second threshold of 0.6, the media guidance application may refrain from sending a notification to the user device, but only add the advertised product to the wish list corresponding to the user profile for the user to review later.

Figure 2:
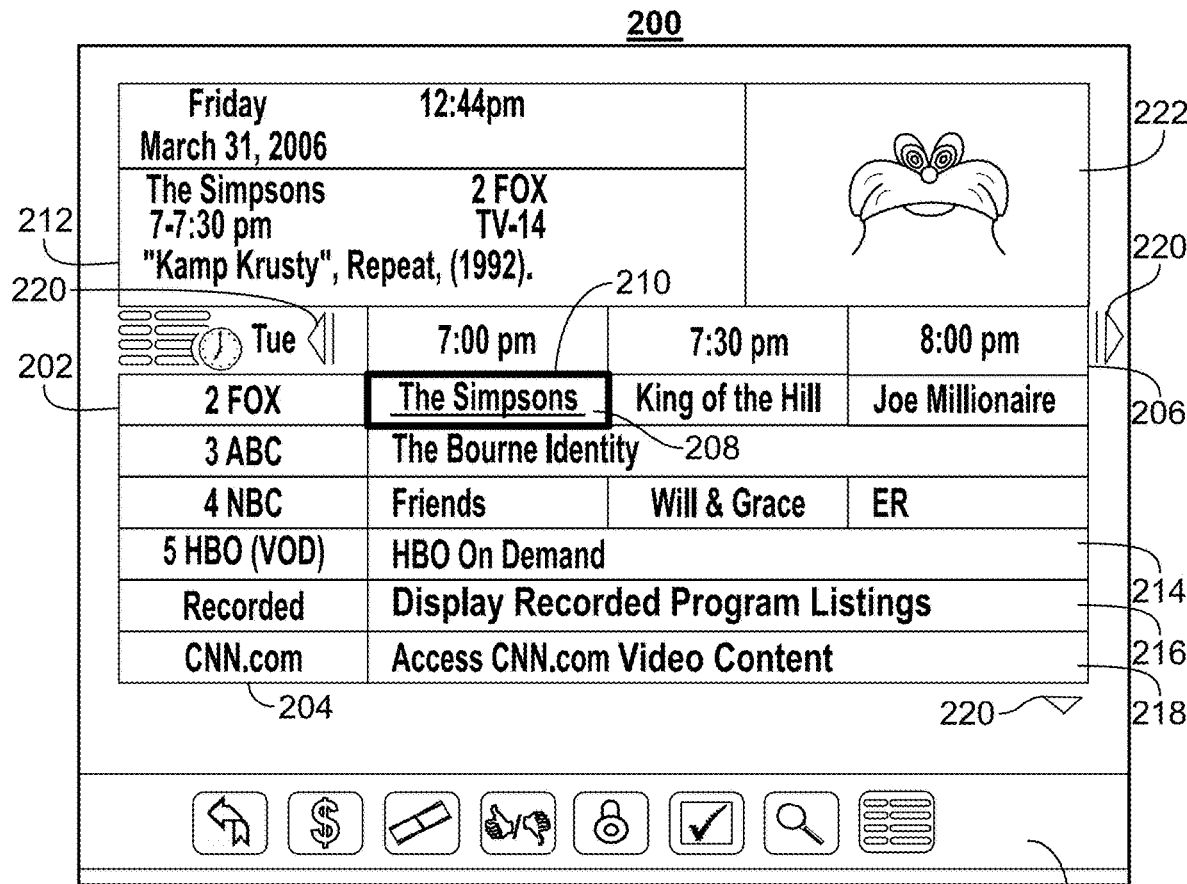
FIG. 2 shows an illustrative embodiment of a display screen that may be used to provide media guidance application listings and other media guidance information, in accordance with some embodiments of the disclosure.
Figure 3:
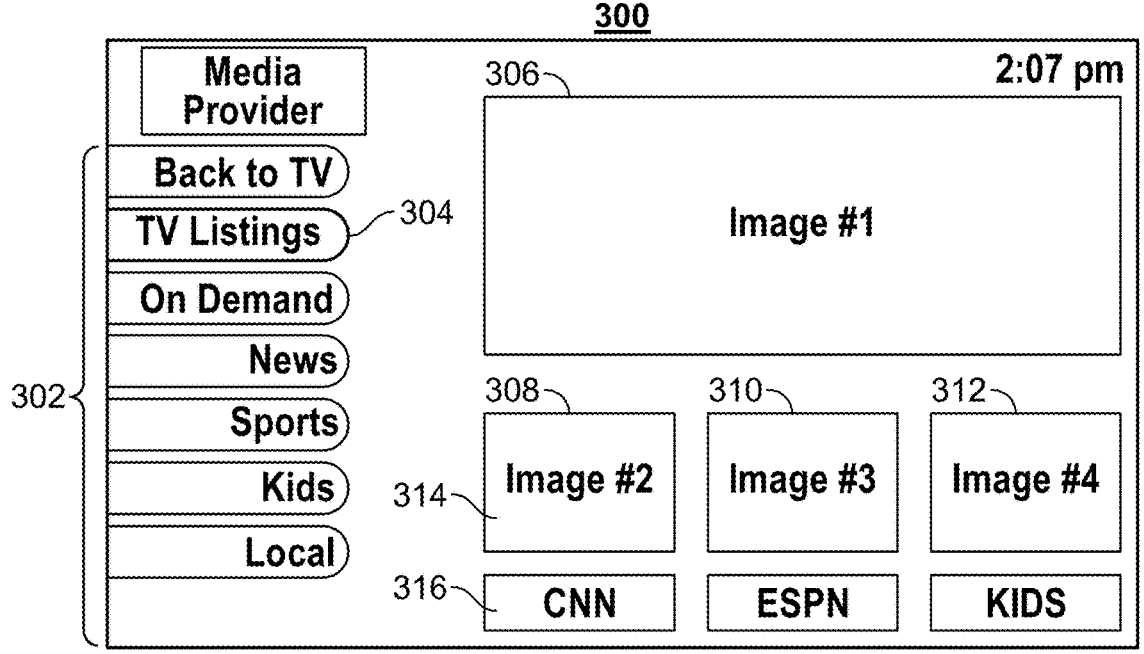
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform, e.g., user equipment 106 or 114 in FIG. 1. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

Figure 6:
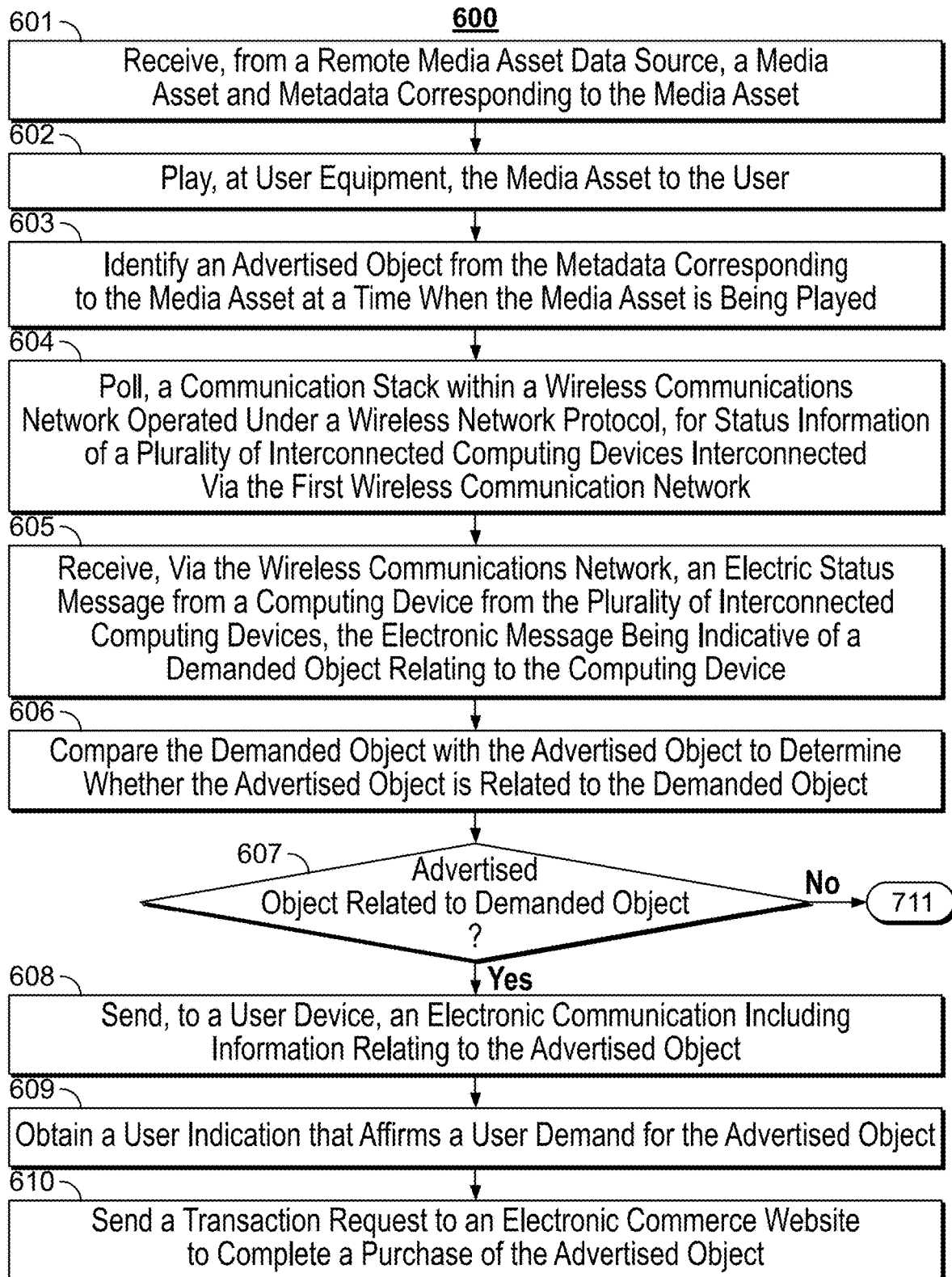
FIG. 6 depicts an illustrative flowchart of a process for identifying and correlating an advertised object from a media asset with demands from a plurality of computing devices embedded in a living environment of the user, in accordance with some embodiments of the disclosure.

FIG. 6 depicts an illustrative flowchart of a process for identifying and correlating an advertised object from a media asset with demands from a plurality of computing devices embedded in a living environment of the user, in accordance with some embodiments of the disclosure. Process 600 may be executed by control circuitry 404 (e.g., in a manner instructed to control circuitry 404 by the media guidance application). Control circuitry 404 may be part of user equipment (e.g., user equipment 106, user television equipment 502, user computer equipment 504, and/or wireless communications device 506), or of a remote server separated from the user equipment by way of communications network 514.

Process 600 begins at 601, where control circuitry 404 receives, from a remote source, a media asset (e.g., from content source 516 in FIG. 5) and metadata (e.g., from media guidance data source 518 in FIG. 5) corresponding to the media asset. At 602, control circuitry 404 plays, at user equipment (e.g., user equipment 106 in FIG. 1, user television equipment 502, user computer equipment 504, and/or wireless communications device 506 in FIG. 5), the media asset to the user. At 603, control circuitry 404 identifies an advertised object (e.g., the coffee product 107 in FIG. 1) from the metadata corresponding to the media asset at a time when the media asset is being played, e.g., see the media asset 105 being played at user equipment 106 in FIG. 1. At 604, control circuitry 404 polls, e.g., via I/O path 402 in FIG. 4, a communication stack within a wireless communications network operated under a wireless network protocol (e.g., see wireless connection 119 in FIG. 1), for status information of a plurality of computing devices (e.g., see devices 111-114 in FIG. 1) interconnected via the wireless communication network. For example, the plurality of computing devices are interconnected via Bluetooth or Wi-Fi, as discussed in relation to FIG. 1. The polling at 604 is described in further detail in relation to FIG. 7.

At 605, control circuitry 404 receives, via the wireless communications network, an electronic status message from a computing device of the plurality of computing devices. The electronic message is indicative of a demanded object relating to the computing device. For example, control circuitry 404 may receives a message from the coffee machine 114 that new coffee capsules are demanded, as discussed in relation to FIG. 1. At 606, control circuitry 404 compares the demanded object (e.g., coffee capsules for the coffee machine 114 in FIG. 1) with the advertised object (e.g., coffee product 107 in FIG. 1) to determine whether the advertised object is related to the demanded object. At 607, if the advertised object is related to the demanded object based on the comparing, process 600 proceeds to 608, where control circuitry 404 sends, to a user device (e.g., user device 115 in FIG. 1), an electronic communication (e.g., message 122 in FIG. 1) including information relating to the advertised object. Further detail with respect to whether and when to send the electronic communication is described in relation to FIG. 8. At 609, control circuitry 404 obtains a user indication that affirms a user demand for the advertised object. For example, the user may swipe, tap on the user device (e.g., via user input interface 410 in FIG. 4), use a voice command (e.g., via speakers 414 in FIG. 4), and/or the like, to affirm that the user is interested in the advertised object. At 610, control circuitry 404 sends a transaction request to an electronic commerce website to complete a purchase of the advertised object, as discussed in further detail in relation to FIG. 9.

Figure 7:
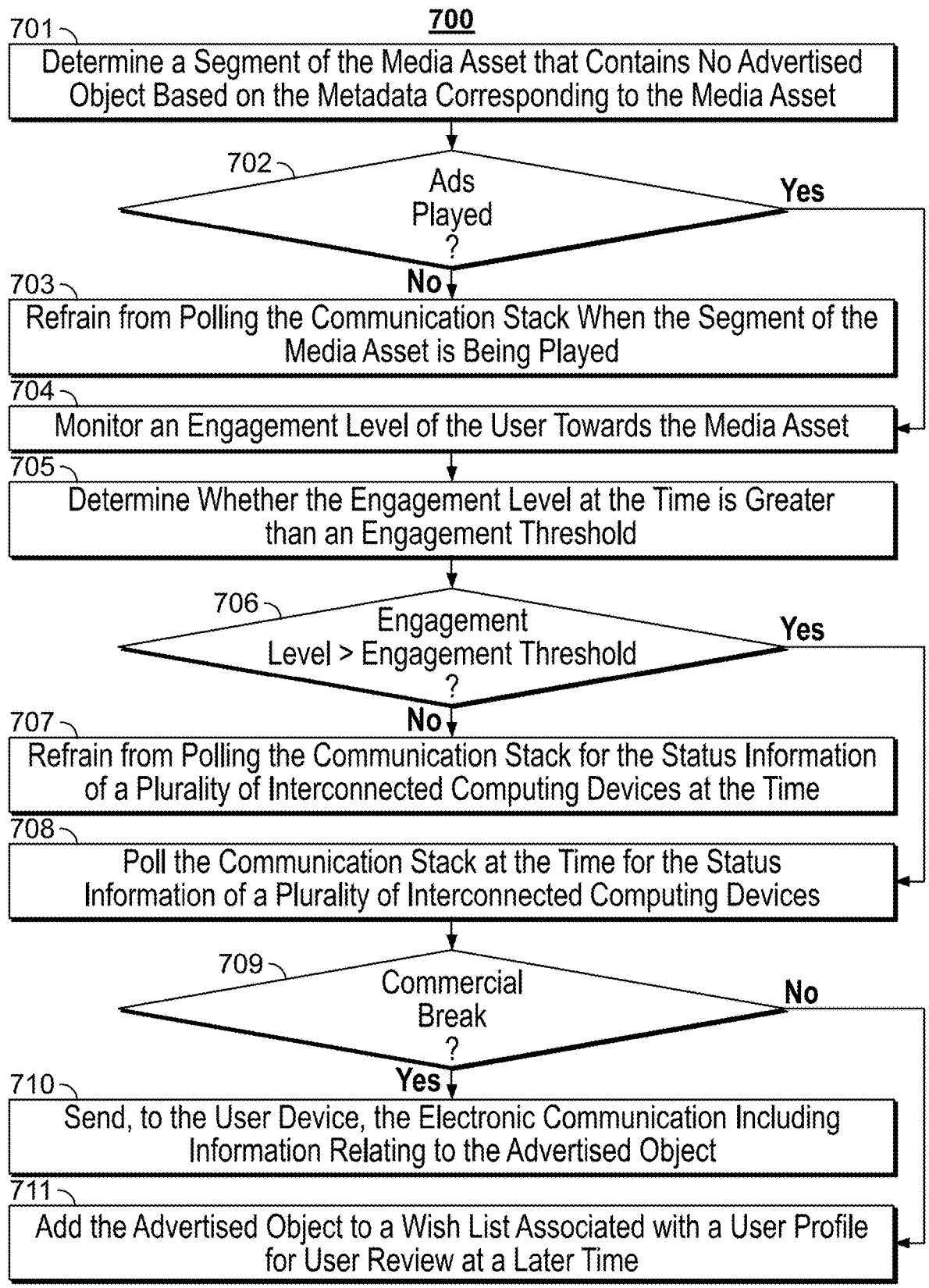
FIG. 7 depicts an illustrative flowchart of a process for polling a wireless communication stack for status information of a plurality of computing devices, in accordance with some embodiments of the disclosure.

At 607, if the advertised object is unrelated to the demand object, process 600 continues to 711 in FIG. 7.

FIG. 7 depicts an illustrative flowchart of a process for polling a wireless communication stack for status information of a plurality of computing devices (e.g., see 604 in FIG. 6), in accordance with some embodiments of the disclosure. Process 700 may be executed by control circuitry 404 (e.g., in a manner instructed to control circuitry 404 by the media guidance application). Control circuitry 404 may be part of user equipment (e.g., user equipment 106, user television equipment 502, user computer equipment 504, and/or wireless communications device 506), or of a remote server separated from the user equipment by way of communications network 514.

Process 700 begins at 701, where control circuitry 404 determines a segment of the media asset that contains no advertised object based on the metadata corresponding to the media asset. At 702, if the segment of the media asset contains no advertisement, process 700 continues to 703, where control circuitry 404 refrains from polling the communication stack when the segment of the media asset is being played. At 702, if the segment of the media asset contains an advertisement, process 700 continues to 704, where control circuitry 404 monitors an engagement level of the user towards the media asset. For example, control circuitry 404 may collect user activities via user input interface 410 in FIG. 4. At 705, control circuitry 404 determines whether the engagement level at the time is greater than an engagement threshold. At 706, if the engagement level at the time is no greater than the engagement threshold, process 700 continues to 707, where control circuitry 404 refrains from polling the communication stack for the status information of a plurality of interconnected computing devices at the time. At 706, if the engagement level at the time is greater than the engagement threshold, process 700 continues to 708, where control circuitry 404 polls the communication stack at the time for the status information of a plurality of interconnected computing devices. At 709, if control circuitry 404 determines that the media asset is at a commercial break, process 700 continues to 710, where control circuitry 404 sends, to the user device, the electronic communication including information relating to the advertised object. At 709, if control circuitry 404 determines that the media asset is not at a commercial break, process 700 continues to 711, where control circuitry 404 adds the advertised object to a wish list associated with a user profile for user review at a later time. For example, control circuitry 404 only sends a notification to the user device at commercial breaks to reduce interruption of the viewing experience.

Figure 8:
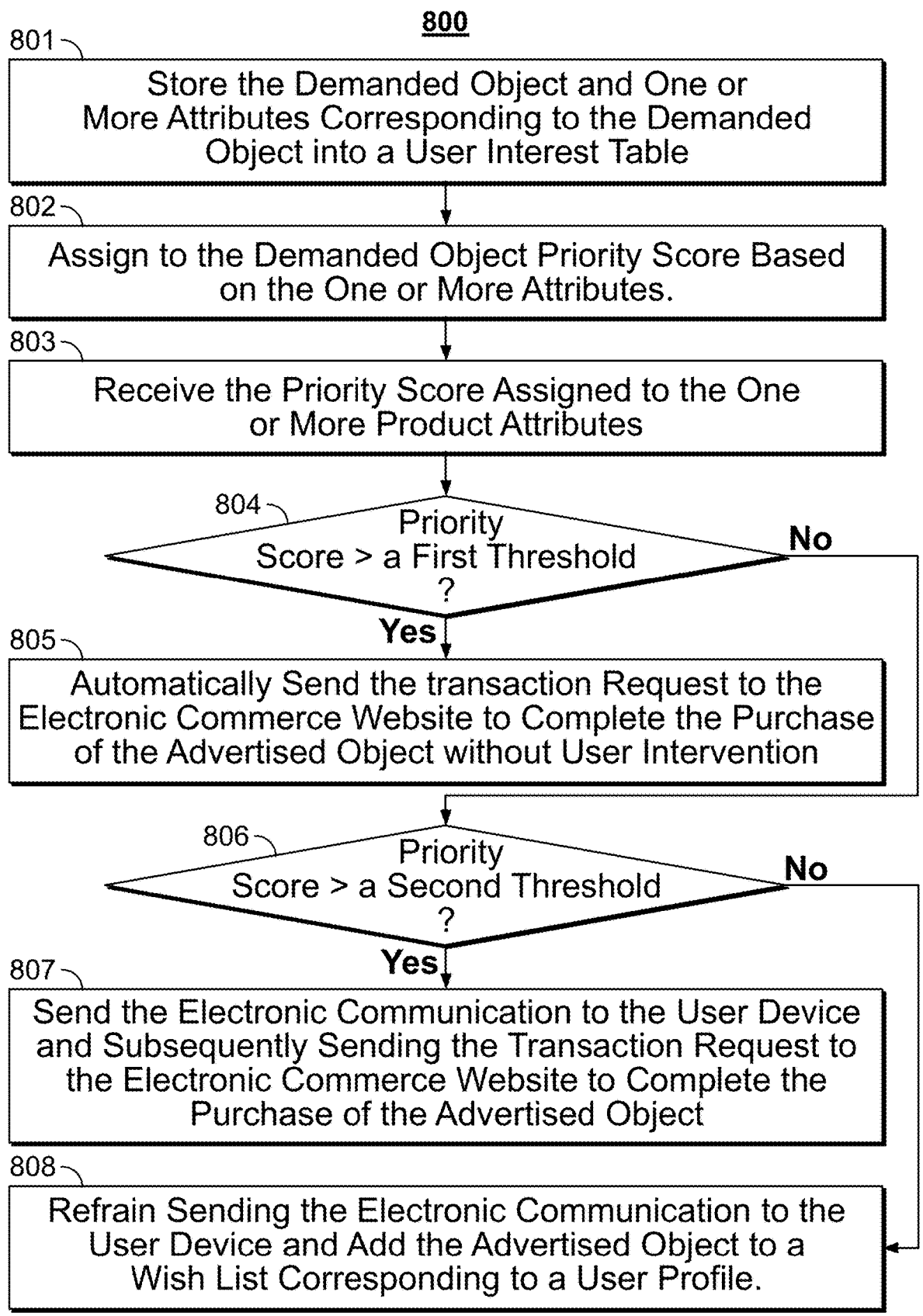
FIG. 8 depicts an illustrative flowchart of a process for determining whether to send an electronic communication to a user device (e.g., see 608 in FIG. 6), in accordance with some embodiments of the disclosure.

FIG. 8 depicts an illustrative flowchart of a process for determining whether to send an electronic communication to a user device (e.g., see 608 in FIG. 6), in accordance with some embodiments of the disclosure. Process 700 may be executed by control circuitry 404 (e.g., in a manner instructed to control circuitry 404 by the media guidance application). Control circuitry 404 may be part of user equipment (e.g., user equipment 106, user television equipment 502, user computer equipment 504, and/or wireless communications device 506), or of a remote server separated from the user equipment by way of communications network 514.

Process 800 begins at 801, where control circuitry 404 stores the demanded object and one or more attributes corresponding to the demanded object into a user interest table, e.g., at storage 408 in FIG. 4, or at a remote data source 518 in FIG. 5. At 802, control circuitry 404 assigns to the demanded object a priority score based on the one or more attributes. For example, the one or more attributes include any of the product type, keyword, brand name, corresponding computing device, and/or the like. At 803, control circuitry 404 retrieves the priority score assigned to the one or more product attributes, e.g., from storage 408 in FIG. 4, or from the remote data source 518 via communications network 514 in FIG. 5. At 804, if the priority score is greater than a first pre-defined priority threshold, process 800 continues to 805, where control circuitry 404 automatically sends the transaction request to the electronic commerce website to complete the purchase of the advertised object without user intervention. For example, the user may only need to provide minimum confirmation such as a voice command via speakers 414 in FIG. 4. At 804, if the priority score is not greater then the first pre-defined priority threshold, but greater than a second pre-defined priority threshold at 806, process 800 continues to 807, where control circuitry 404 sends the electronic communication to the user device and subsequently sends the transaction request to the electronic commerce website to complete the purchase of the advertised object. At 806, if the priority score is not greater then the second pre-defined priority threshold, control circuitry 404 refrains from sending the electronic communication to the user device and adding the advertised object to a wish list corresponding to a user profile.

Figure 9:
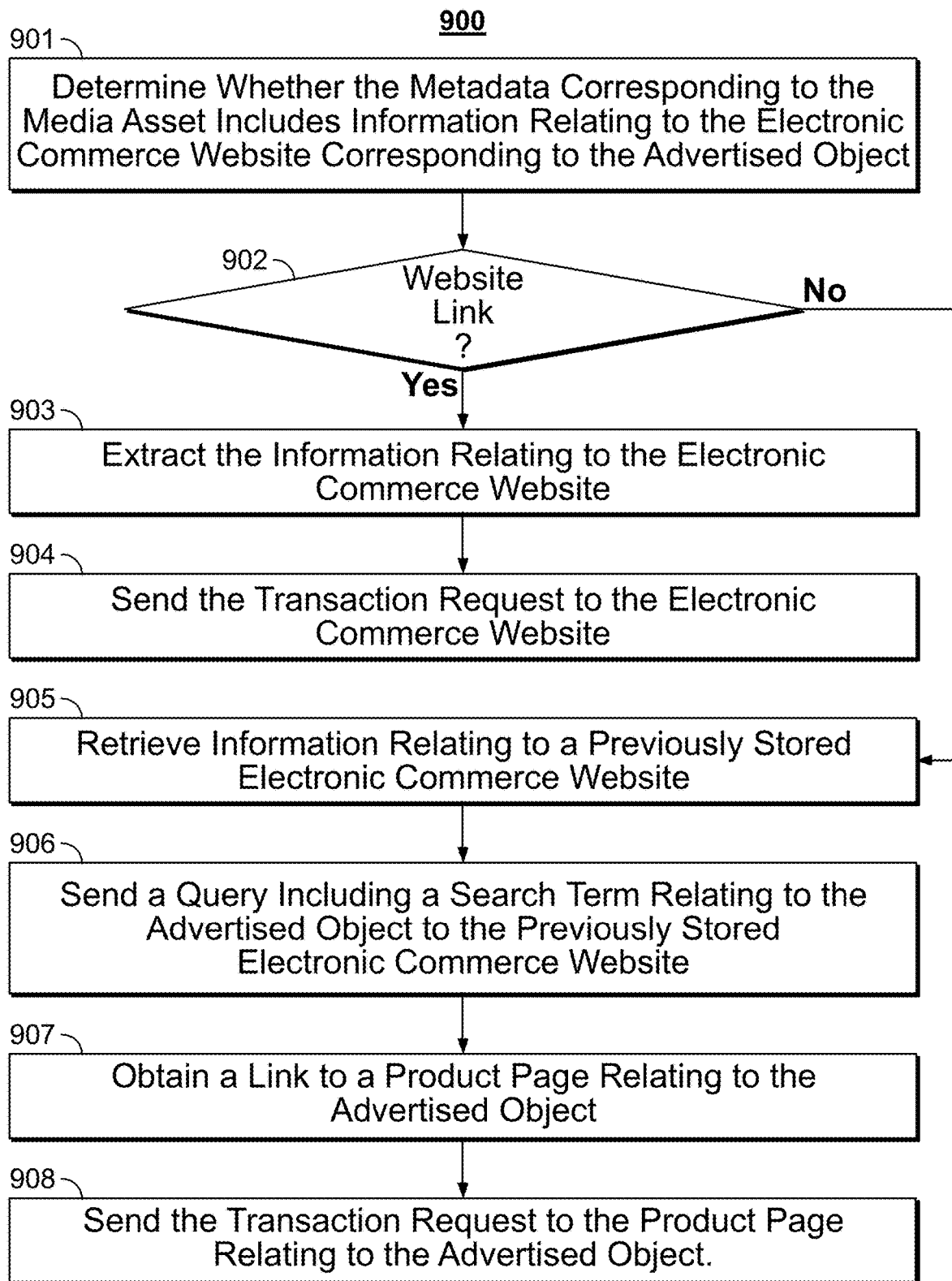
FIG. 9 depicts an illustrative flowchart of a process for sending a transaction request to initiate a purchase of the advertised product, in accordance with some embodiments of the disclosure.

FIG. 9 depicts an illustrative flowchart of a process for sending a transaction request to initiate a purchase of the advertised product (e.g., see 610 in FIG. 6), in accordance with some embodiments of the disclosure. Process 900 may be executed by control circuitry 404 (e.g., in a manner instructed to control circuitry 404 by the media guidance application). Control circuitry 404 may be part of user equipment (e.g., user equipment 106, user television equipment 502, user computer equipment 504, and/or wireless communications device 506), or of a remote server separated from the user equipment by way of communications network 514.

Process 900 begins at 901, where control circuitry 404 determines whether the metadata corresponding to the media asset includes information relating to the electronic commerce website corresponding to the advertised object. At 902, if the metadata relating to an advertisement contains a website link, process 900 continues to 903, where control circuitry 404 extracts the information relating to the electronic commerce website (e.g., a URL link), and then sends the transaction request to the electronic commerce website at 904. At 902, if the metadata relating to an advertisement does not contain a website link, process 900 continues to 905, where control circuitry 404 retrieves information relating to a previously stored electronic commerce website (e.g., Amazon.com®, Bestbuy.com®, etc.). At 906, control circuitry 404 sends a query including a search term relating to the advertised object to the previously stored electronic commerce website. At 907, control circuitry 404 obtains a link to a product page relating to the advertised object. At 908, control circuitry 404 sends the transaction request to the product page relating to the advertised object.

Figure 10:
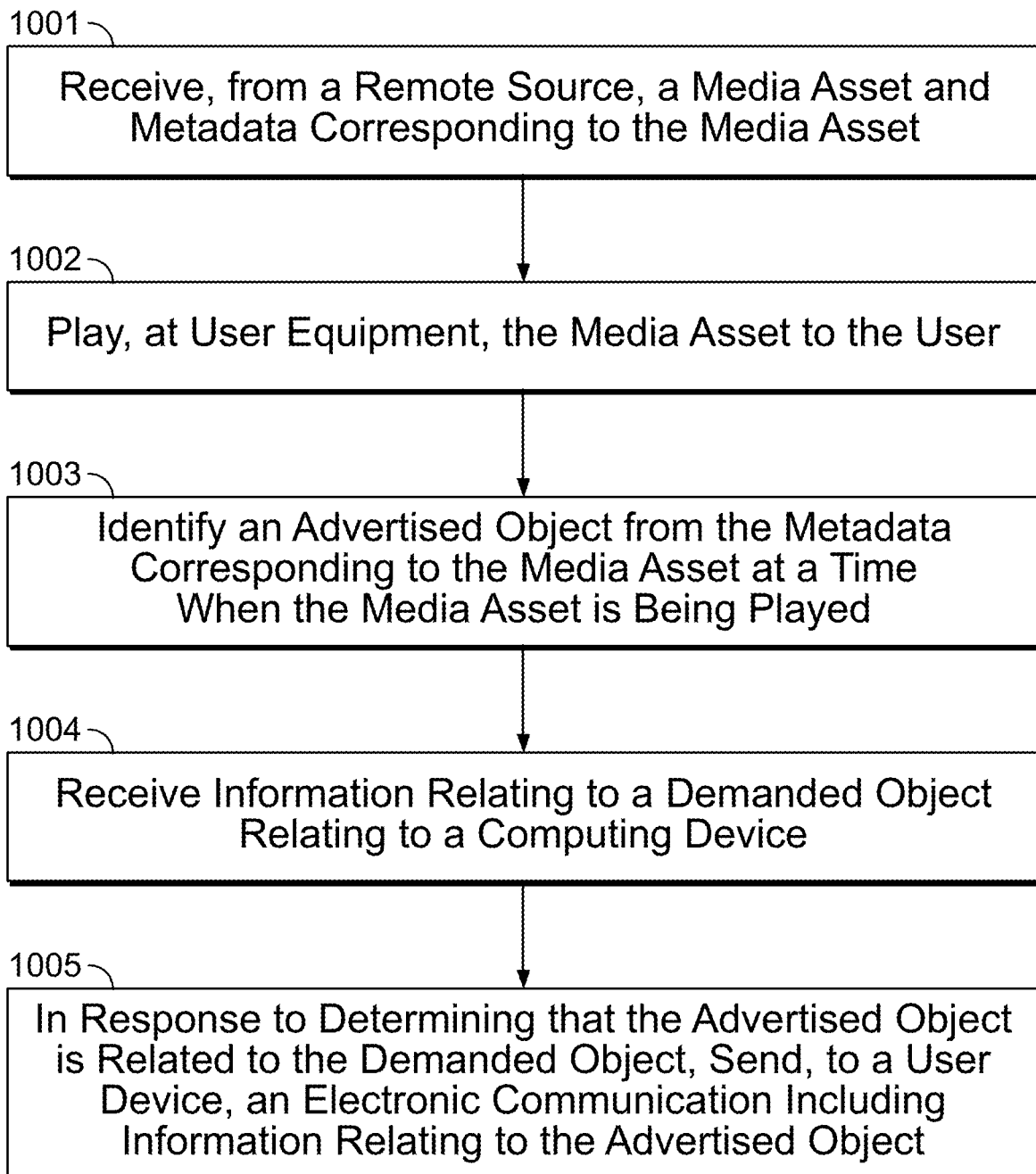
FIG. 10 depicts an illustrative flowchart of a process for identifying and correlating an advertised object from a media asset with a demanded object of a computing device, in accordance with alternative embodiments of the disclosure.

FIG. 10 depicts an illustrative flowchart of a process for identifying and correlating an advertised object from a media asset with a demanded object of a computing device, in accordance with alternative embodiments of the disclosure. Process 1000 may be executed by control circuitry 404 (e.g., in a manner instructed to control circuitry 404 by the media guidance application). Control circuitry 404 may be part of user equipment (e.g., user equipment 106, user television equipment 502, user computer equipment 504, and/or wireless communications device 506), or of a remote server separated from the user equipment by way of communications network 514.

Process 1000 begins at 1001, where control circuitry 404 receives a media asset (e.g., from content source 516 in FIG. 5) and metadata (e.g., from media guidance data source 518 in FIG. 5) corresponding to the media asset. At 1002, control circuitry 404 plays, at user equipment, the media asset to the user. At 1003, control circuitry 404 identifies an advertised object from the metadata corresponding to the media asset at a time when the media asset is being played. At 1004, control circuitry 404 receives information relating to a demanded object relating to a computing device. At 1005, in response to determining that the advertised object is related to the demanded object, control circuitry 404 sends, to a user device, an electronic communication including information relating to the advertised object.

It should be noted that processes 600-900 or any step thereof could be performed on, or provided by, any of the devices shown in, or described with respect to, FIGS. 1 and 4-5. For example, any of processes 600-900 may be executed by control circuitry 404 (FIG. 4) as instructed by control circuitry implemented on user equipment 106 (FIG. 1), 502, 504, 506 (FIG. 5), and/or the like for generating and displaying a summary view of a media asset. In addition, one or more steps of processes 600-900 may be incorporated into or combined with one or more steps of any other process or embodiment.

It is contemplated that the steps or descriptions of each of FIGS. 6-9 may be used with any other embodiment of this disclosure. In addition, the steps and descriptions described in relation to FIGS. 6-9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 4-5 could be used to perform one or more of the steps in FIGS. 6-9.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining whether the advertised object is related to the demanded object, e.g., by processing circuitry 406 of FIG. 4. The processing circuitry, for instance, may be a general purpose processor, a customized integrated circuit (e.g., an ASIC), or a field-programmable gate array (FPGA) within user equipment 400, media content source 516, or media guidance data source 518. For example, attributes corresponding to an advertised object, and priority scores corresponding to the objects, as described herein, may be stored in, and retrieved from, storage 408 of FIG. 4, or media guidance data source 518 of FIG. 5. Furthermore, processing circuitry, or a computer program, may update configuration data of the media guidance application, which may be stored within storage 408 of FIG. 4 or media guidance data source 518 of FIG. 5.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
    receiving a media asset and metadata corresponding to the media asset;
    playing the media asset at a first device;
    identifying an advertised object from the metadata corresponding to the media asset;
    in response to identifying the advertised object:
        receiving, at the first device via a communications network, a status of a consumption level for a consumable object at a second device;
        determining that the status of the consumption level indicates the consumable object is a demanded object at the second device; and
        determining that the advertised object is related to the demanded object;
    determining a type of the metadata corresponding to the media asset;
    in response to determining that the type of the metadata correlates with an advertising segment playback of the media asset, sending, to a user device, an electronic communication including information relating to the advertised object; and
    in response to determining that the type of the metadata correlates with a content segment playback of the media asset, adding the advertised object to a list of objects associated with a user profile.

2. The method of claim 1, further comprising:
    in response to the determining that the advertised object is related to the demanded object, receiving a priority score corresponding to the demanded object.

3. The method of claim 1, wherein the receiving the status of the consumption level for the consumable object at the second device comprises:
    polling for status information of a plurality of devices interconnected via the communications network; and
    receiving, from the status information via the communications network, a status indicator of the second device of the plurality of devices.

4. The method of claim 3, wherein the polling for the status information comprises polling a communication stack within the communications network operated under a wireless network protocol for the status information.

5. The method of claim 3, wherein the polling for the status information comprises:
    determining the content segment of the media asset contains no advertised object based on the metadata corresponding to the media asset; and
    refraining from polling for the status information during playback of the content segment.

6. The method of claim 1, further comprising:
    detecting an engagement level towards the media asset is greater than an engagement threshold; and
    in response to the detecting, receiving the status of the consumption level for the consumable object at the second device.

7. The method of claim 1, wherein the list of objects associated with the user profile is a wish list.

8. The method of claim 1, wherein the sending the electronic communication comprises:
    routing the electronic communication to a remote communication server, wherein the remote communication server transmits the electronic communication to the user device.

9. The method of claim 1, wherein the electronic communication comprises a transaction request related to purchasing the advertised object.

10. The method of claim 1, wherein the metadata is associated with a currently presented segment of the media asset, and wherein the currently presented segment of the media asset comprises the advertising segment or the content segment.

11. A system comprising:
communication circuitry configured to receive and transmit data; and
control circuitry configured to:
 receive a media asset and metadata corresponding to the media asset;
 play the media asset at a first device;
 identify an advertised object from the metadata corresponding to the media asset;
 in response to identifying the advertised object:
  receive, at the first device via a communications network, a status of a consumption level for a consumable object at a second device;
  determine that the status of the consumption level indicates the consumable object is a demanded object at the second device; and
  determine that the advertised object is related to the demanded object;
 determine a type of the metadata corresponding to the media asset;
 in response to determining that the type of the metadata correlates with an advertising segment playback of the media asset, send, to a user device, an electronic communication including information relating to the advertised object; and
 in response to determining that the type of the metadata correlates with a content segment playback of the media asset, add the advertised object to a list of objects associated with a user profile.

12. The system of claim 11, wherein the control circuitry is further configured to:
in response to determining that the advertised object is related to the demanded object, receive a priority score corresponding to the demanded object.

13. The system of claim 11, wherein the control circuitry, when receiving the status of the consumption level for the consumable object at the second device, is configured to:
poll for status information of a plurality of devices interconnected via the communications network; and
receive, from the status information via the communications network, a status indicator of the second device of the plurality of devices.

14. The system of claim 13, wherein the control circuitry, when polling for the status information, is configured to poll a communication stack within the communications network operated under a wireless network protocol for the status information.

15. The system of claim 13, wherein the control circuitry, when polling for the status information, is configured to:
determine the content segment of the media asset contains no advertised object based on the metadata corresponding to the media asset; and
refrain from polling for the status information during playback of the content segment.

16. The system of claim 11, wherein the control circuitry is further configured to:
detect an engagement level towards the media asset greater than an engagement threshold; and
in response to detecting the engagement level towards the media asset greater than the engagement threshold, receive the status of the consumption level for the consumable object at the second device.

17. The system of claim 11, wherein the list of objects associated with the user profile is a wish list.

18. The system of claim 11, wherein the control circuitry, when sending the electronic communication, is configured to route the electronic communication to a remote communication server, and wherein the remote communication server transmits the electronic communication to the user device.

19. The system of claim 11, wherein the electronic communication comprises a transaction request related to purchasing the advertised object.

20. The system of claim 11, wherein the metadata is associated with a currently presented segment of the media asset, and wherein the currently presented segment of the media asset comprises the advertising segment or the content segment.

* * * * *